United States Patent
Johnson et al.

(10) Patent No.: US 11,599,509 B2
(45) Date of Patent: *Mar. 7, 2023

(54) PARALLEL ACCESS TO DATA IN A DISTRIBUTED FILE SYSTEM

(71) Applicant: Ab Initio Technology LLC, Lexington, MA (US)

(72) Inventors: Ann M. Johnson, Groton, MA (US); Bryan Phil Douros, Framingham, MA (US); Marshall Alan Isman, Newton, MA (US); Timothy Wakeling, Park City, UT (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,368

(22) Filed: Aug. 31, 2020

(65) Prior Publication Data

US 2021/0089503 A1 Mar. 25, 2021

Related U.S. Application Data

(63) Continuation of application No. 14/090,434, filed on Nov. 26, 2013, now Pat. No. 10,776,325.

(51) Int. Cl.
*G06F 16/185* (2019.01)
*G06F 16/182* (2019.01)
(Continued)

(52) U.S. Cl.
CPC ........ *G06F 16/1858* (2019.01); *G06F 9/5011* (2013.01); *G06F 16/182* (2019.01); *G06F 16/2471* (2019.01)

(58) Field of Classification Search
None
See application file for complete search history.

(56) References Cited

U.S. PATENT DOCUMENTS

| 5,226,159 A | 7/1993 | Henson et al. |
| 5,897,638 A | 4/1999 | Lasser et al. |

(Continued)

FOREIGN PATENT DOCUMENTS

| CN | 1292118 | 4/2001 |
| CN | 101398771 | 4/2009 |

(Continued)

OTHER PUBLICATIONS

"Connectors for Apache Hadoop and non-Microsoft Business Intelligence and ETL Products" Microsoft SQL Server 2008 R2—Parallel Data Warehouse (Dec. 2011).

(Continued)

*Primary Examiner* — Son T Hoang
(74) *Attorney, Agent, or Firm* — Occhiuti & Rohlicek LLP

(57) ABSTRACT

An approach to parallel access of data from a distributed filesystem provides parallel access to one or more named units (e.g., files) in the filesystem by creating multiple parallel data streams such that all the data of the desired units is partitioned over the multiple streams. In some examples, the multiple streams form multiple inputs to a parallel implementation of a computation system, such as a graph-based computation system, dataflow-based system, and/or a (e.g., relational) database system.

20 Claims, 4 Drawing Sheets

(51) Int. Cl.
*G06F 16/24* (2019.01)
*G06F 16/18* (2019.01)
*G06F 9/50* (2006.01)
*G06F 16/2458* (2019.01)

(56) References Cited

U.S. PATENT DOCUMENTS

| | | | |
|---|---|---|---|
| 5,966,072 | A | 10/1999 | Stanfill et al. |
| 6,237,009 | B1 | 5/2001 | Waldo et al. |
| 6,389,420 | B1 | 5/2002 | Vahalia et al. |
| 6,446,070 | B1 | 9/2002 | Arnold et al. |
| 7,200,747 | B2 | 4/2007 | Riedel et al. |
| 7,210,148 | B2 | 4/2007 | Arnold et al. |
| 7,315,926 | B2 | 1/2008 | Fridella et al. |
| 7,587,467 | B2 | 9/2009 | Hesselink et al. |
| 7,716,630 | B2 | 5/2010 | Wholey et al. |
| 7,962,779 | B2 | 6/2011 | Patel et al. |
| 8,304,135 | B2 | 11/2012 | Sugitani et al. |
| 8,356,050 | B1 | 1/2013 | Olston et al. |
| 8,539,192 | B2 | 9/2013 | Castillo et al. |
| 8,887,156 | B2 | 11/2014 | Chambers et al. |
| 8,918,388 | B1 | 12/2014 | Chen |
| 8,954,568 | B2 | 2/2015 | Krishnan et al. |
| 8,966,112 | B1* | 2/2015 | Franke |
| 9,081,772 | B1* | 7/2015 | Welton ............... G06F 16/217 |
| 9,113,299 | B2 | 8/2015 | Sanders |
| 9,146,959 | B2 | 9/2015 | Chen et al. |
| 9,158,843 | B1 | 10/2015 | Florissi et al. |
| 9,172,608 | B2 | 10/2015 | Zeyliger et al. |
| 9,201,638 | B2 | 12/2015 | Ravi et al. |
| 9,235,446 | B2 | 1/2016 | Bruno et al. |
| 9,268,590 | B2 | 2/2016 | Du et al. |
| 9,342,557 | B2 | 5/2016 | Kornacker et al. |
| 9,367,601 | B2 | 6/2016 | Babu et al. |
| 9,424,119 | B2 | 8/2016 | Ercegovac et al. |
| 9,495,427 | B2 | 11/2016 | Abadi et al. |
| 9,588,994 | B2 | 3/2017 | Grube et al. |
| 2003/0081790 | A1 | 5/2003 | Kallahalla et al. |
| 2005/0144186 | A1 | 6/2005 | Hesselink et al. |
| 2005/0273592 | A1* | 12/2005 | Pryor ............... G06F 16/2471 |
| 2007/0011668 | A1 | 1/2007 | Wholey et al. |
| 2010/0293598 | A1* | 11/2010 | Collart ............... G06F 16/4393 |
| 2011/0027692 | A1 | 2/2011 | Sugitani et al. |
| 2011/0213802 | A1* | 9/2011 | Singh ............... G06F 16/2465 707/774 |
| 2011/0225302 | A1* | 9/2011 | Park ............... G06F 16/1858 |
| 2011/0276789 | A1 | 11/2011 | Chambers et al. |
| 2011/0276962 | A1 | 11/2011 | Chambers et al. |
| 2012/0079323 | A1* | 3/2012 | Chincisan ............ G06F 16/1858 |
| 2012/0239612 | A1 | 9/2012 | George et al. |
| 2012/0307636 | A1* | 12/2012 | Song ............... G06F 16/18 |
| 2013/0024496 | A1 | 1/2013 | Krishnan et al. |
| 2013/0227558 | A1 | 8/2013 | Du et al. |
| 2013/0232180 | A1 | 9/2013 | Grube et al. |
| 2013/0254196 | A1 | 9/2013 | Babu et al. |
| 2013/0325814 | A1 | 12/2013 | Carter |
| 2013/0346988 | A1 | 12/2013 | Bruno et al. |
| 2014/0047422 | A1 | 2/2014 | Ravi et al. |
| 2014/0095470 | A1 | 4/2014 | Chen et al. |
| 2014/0181130 | A1* | 6/2014 | Davis ............... G06F 16/25 |
| 2014/0222890 | A1* | 8/2014 | Zhu ............... G06F 16/176 |
| 2014/0280032 | A1 | 9/2014 | Kornacker et al. |
| 2014/0342714 | A1 | 11/2014 | Sanders |
| 2015/0074151 | A1 | 3/2015 | Chaiken et al. |
| 2015/0127649 | A1 | 5/2015 | Felch |
| 2015/0149503 | A1 | 5/2015 | Wollrath et al. |
| 2015/0248304 | A1* | 9/2015 | Chambers ......... G06F 16/24532 |

FOREIGN PATENT DOCUMENTS

| | | |
|---|---|---|
| CN | 103441996 | 12/2013 |
| JP | 2002505462 | 2/2002 |
| JP | 2008547134 | 12/2008 |
| JP | 2013167942 | 8/2013 |
| KR | 10-2013-0114577 A | 10/2013 |
| WO | 20110074699 | 6/2011 |

OTHER PUBLICATIONS

"DistCp Version 2 Guide" The Apache Software Foundation, pp. 1-12 (2008).
"Hadoop Streaming" The Apache Software Foundation, pp. 1-18 (2008).
"MapReduce Tutorial" The Apache Software Foundation, pp. 1-42 (2008).
Andrew Brust, "Microsoft's PolyBase mashes up SQL Server and Hadoop" ZDNet: Big on Data (Nov. 2012).
Awadallah, Amr. "Introducing Apache Hadoop: The Modern Data Operating System." Stanford EE380 Computer Systems Colloquium; pp. 1-30 (2011).
Daniel Abadi, "Why Database-to-Hadoop Connectors are Fundamentally Flawed and Entirely Unnecessary" HadaptJJuly 2012).
Dhruba Borthakur, "The Hadoop Distributed File System: Architecture and Design" The Apache Software Foundation, pp. 1-14 (2007).
Gates et al., "Building a High-Level Dataflow System on top of Map-Reduce: The Pig Experince", 2009.
Hartman, John H., and John K. Ousterhout. 1992. "Zebra: A Striped Network File System." ACM SIGOPS Operating Systems Review 27 (5): 29-43.
Lay et al. "Leveraging Massively Parallel Processing in an Oracle Environment for Big Data Analytics" Oracle White Paper, pp. 1-9 (Nov. 2010).
Pallickara et al., Granules: A Lightweight, Streaming Runtime for Cloud Computing with Support, for Map-Reduce, IEEE International Conference on Cluster Computing and Workshops, 2009 pp. 1-10.
Shankar et al. "In-Database Map-Reduce" Oracle White Paper, pp. 1-15 (Oct. 2009).
Shankar et al. "Integrating Hadoop Data with Oracle Parallel Processing" Oracle White Paper, pp. 1-20 (Jan. 2010).
Shvachko et al. "The Hadoop Distributed File System", Proc. 26th IEEE Symp. Mass Storage Syst. Technol., pp. 1-11 (2010).
Stephen Sorkin, "Large-Scale, Unstructured Data Retrieval and Analysis Using Splunk" Splunk Inc., pp. 1-7 (2011).

\* cited by examiner

PARALLEL ACCESS TO DATA IN A DISTRIBUTED FILE SYSTEM

CROSS-REFERENCE TO RELATED APPLICATIONS

This application is a continuation of U.S. application Ser. No. 14/090,434, filed on Nov. 26, 2013, now U.S. Pat. No. 10,776,325, which is incorporated herein by reference.

BACKGROUND

This invention relates to parallel access to data in a distributed file system.

An example of a distributed file system is the Hadoop Distributed File System (HDFS). HDFS is a distributed, scalable, and portable file system written in Java. The HDFS has a set of nodes ("datanodes") that hold data for the files in the file system, and can server up blocks of the files over a data network. Each file is generally distributed over multiple nodes. A directory for the file system is maintained by a set of nodes ("namenodes"). This directory can be used to identify the locations of the distributed blocks for each named file in the filesystem.

Referring to FIGS. 1A-B, one way of processing data in a distributed file system, for example in the HDFS, is using a MapReduce programming model. Generally, a MapReduce program includes a Map procedure that performs filtering and sorting (such as sorting students by first name into queues, one queue for each name) and a Reduce procedure that performs a summary operation (such as counting the number of students in each queue, yielding name frequencies). A user of the system specifies the Map and Reduce procedures, but does not necessarily determine the number of instances (or invocations) of each procedure (i.e., "processes") or the nodes on which they execute. Rather, a "MapReduce System" (also called "infrastructure", "framework") orchestrates by marshaling a set of distributed nodes, running the various tasks (e.g., the Map and Reduce procedures and associated communication) in parallel, managing all communications and data transfers between the various parts of the system, providing for redundancy and failures, and overall management of the whole process. A MapReduce system can schedule execution of instances of Map or Reduce procedures with an awareness of the data location. In FIG. 1A, the HDFS is an example of a distributed filesystem 110 and the Hadoop framework is an example of a distributed processing system, such that a set of map procedures 24 execute on processors 122 in parallel to process parts 14 of a distributed file and store output files 16 in the filesystem 110. In FIG. 1B a set of reduce procedures 26 process the outputs of the map procedures to produce output files 18 completing the MapReduce execution.

Although there are computational advantages that can be gained using a distributed file system that is integrated with a MapReduce system, access to data for processing with other programming paradigms can be inefficient. For example, extraction of data may result in a bottleneck, for example, passing all the data for a file through a single data stream, even if the processing of the data is itself parallel. For example, the HDFS provides a filesystem command (hadoop fs-cat file) which passes the content of the file to the standard output and potentially streamed to a process or server where the contents may be processed in parallel.

One approach to avoiding this type of bottleneck is to explicitly divide large files into separate named parts (i.e., with individual entries in the directory), and then cause each part to be extracted in a separate stream. However, such approaches may have disadvantages, for instance, requiring a prior decision as to the number of parts, and potential suboptimal selection of nodes on which to extract the parts, for example, because the named parts are themselves distributed.

Another approach to providing data from a distributed filesystem to an application, for instance to a database engine, is to implement the application within or tightly coupled to the filesystem. However, such an approach can be limited to processing using a specific application, and does not necessarily benefit from advances in implementations of the application that are not ported into the filesystem.

SUMMARY

In one aspect, in general, a new approach to parallel extraction of data from a distributed filesystem provides parallel access to one or more named units (e.g., files) in the filesystem by creating multiple parallel data streams such that all the data of the desired units is partitioned over the multiple streams. In some examples, the multiple streams form multiple inputs to a parallel implementation of a computation system, such as a graph-based computation system, dataflow-based system, and/or a (e.g., relational) database system.

One implementation of the approach makes use of a supervisory or manager function of the file storage system that accepts a specification of one or more named units (e.g., files) in the file system and a specification of a set of destinations for the content of the specified units. The supervisory function then creates multiple executing instances of an extraction procedure. Each instance of the extraction procedure is configured by the supervisory function to access a part of the desired content, and is configured to transfer that content to one of the set of specified destinations, for example, using a data streaming (e.g., TCP streams, local named pipes, etc.). In some examples, the supervisory function also receives other information such as a desired number of (or limits on) instances of the extraction procedures, particular computational procedures to execute on the extracted content before transmission to the destinations, or information regarding desired locations (e.g., nodes) at which the extraction procedures are to be hosted.

A variety of approaches can be used to specify the set of destinations and to establish the connections between the extraction procedures and the consumers of the data from those procedures. In one example, the set of destinations has a name, and each extraction procedure is configured with a way to access (e.g., a network address of) a shared "broker". Before transferring data, the extraction procedure communicates with the broker, which provides a specific location (e.g., a network address) to the destination of the content from the requesting extraction process.

One implementation of the extraction procedure makes use of a standard Map function (e.g., with no Reduce stage). A standard supervisory function determines where to execute instances of the Map and the segments of the desired files that are processed by the Map. The specific procedure performed by the map (e.g., a user specified output filter of the Map) then streams the content to the desired destination rather than causing it to be stored on the file system.

In some versions of the system, instances of the processes that are consumers or potential consumers of the extracted content execute on the same computation nodes that are available to host the extraction procedures, and a decision process implemented by the broker may attempt to co-locate the extraction procedures and the consumers of the data extracted by the extraction procedures, thereby permitting local transfer of the content for processing (e.g., through in-memory messaging, UNIX named pipes, etc.). In some such versions, the broker selects destinations for the extracted data from each extraction procedure, for instance, by selecting a destination process that is co-located on a same computation node as the extraction procedure.

In some implementations, certain processing may be efficiently implemented within or tightly linked with the extraction procedures. For example, certain data filtering, format restructuring, or in some cases certain aggregation tasks, may be hosted within the extraction procedure.

In one aspect, in general, a method for processing data includes: receiving a specification of one or more named units stored in a distributed filesystem of a distributed processing system; receiving a specification for establishing data connections to a computation system separate from the distributed processing system; invoking a first plurality of processes on the distributed processing system, each process of the first plurality of processes establishing a data connection with a storage element of the distributed filesystem for accessing a corresponding part of the named unit in the distributed filesystem; using the specification for establishing the data connections to form a plurality of data connections between the distributed processing system and the computation system, at least one data connection being formed between each process of the first plurality of processes and the computation system; and passing data concurrently over the plurality of data connections from the distributed processing system to the computation system.

Aspects can include one or more of the following features.

Passing the data concurrently includes extracting the data from the filesystem by the processes of the first plurality of processes, and transmitting the extracted data from said processes to the computation system without further storage in the distributed file system.

Accepting the specification of the named units includes accepting a text filename of the named unit.

The parts of the named units are unnamed.

Accepting the specification for establishing the data connections includes accepting a specification of a broker and forming the data connections includes each processes of the first plurality of processes communicating with the broker to determine a further specification for establishing a data connection with the computation system.

Accepting the specification for establishing the data connections includes accepting a specification for a broadcast to the computation system.

The computation system includes a second plurality of processes, and wherein forming the data connection between each process of the first plurality of processes and the computation system includes forming data connections between the processes of the first plurality of processes and processes of the second plurality of processes.

The method further includes invoking the processes of the second plurality of processes of the computation system.

At least some of the first plurality of processes and some of the second plurality of processes are executed on a common set of processors.

The distributed processing system and the computation system use distinct computing resources coupled over a data network.

The distributed processing system and the computation system share computing resources.

In another aspect, in general, software is stored on a non-transitory computer-readable medium, for processing data. The software includes instructions for causing a system to: receive a specification of one or more named units stored in a distributed filesystem of a distributed processing system; receive a specification for establishing data connections to a computation system separate from the distributed processing system; invoke a first plurality of processes on the distributed processing system, each process of the first plurality of processes establishing a data connection with a storage element of the distributed filesystem for accessing a corresponding part of the named unit in the distributed filesystem; use the specification for establishing the data connections to form a plurality of data connections between the distributed processing system and the computation system, at least one data connection being formed between each process of the first plurality of processes and the computation system; and pass data concurrently over the plurality of data connections from the distributed processing system to the computation system.

In another aspect, in general, a system for processing data includes: a distributed processing system that includes a distributed filesystem; and a computation system separate from the distributed processing system. The distributed processing system is configured to: receive a specification of one or more named units stored in the distributed filesystem; receive a specification for establishing data connections to the computation system; invoke a first plurality of processes, each process of the first plurality of processes establishing a data connection with a storage element of the distributed filesystem for accessing a corresponding part of the named unit in the distributed filesystem; use the specification for establishing the data connections to form a plurality of data connections between the distributed processing system and the computation system, at least one data connection being formed between each process of the first plurality of processes and the computation system; and pass data concurrently over the plurality of data connections to the computation system.

In another aspect, in general, a method for processing data includes: providing a specification of one or more named units stored in a distributed filesystem; providing a specification for establishing data connections with a computation system; providing a specification for processes of a first plurality of processes for invocation on a distributed processing system, each process of the first plurality of processes being specified for establishing a data connection with a storage element of the distributed filesystem for accessing a corresponding part of the named unit in the distributed filesystem; receiving requests to form a plurality of data connections between the distributed processing system and the computation system, and providing information for forming at least one data connection being between each process of the first plurality of processes and the computation system; and receiving data concurrently over the plurality of data connections from the first plurality of processes at the computation system.

Aspects can include one or more of the following features.

The method further includes invoking a second plurality of processes in the computation system, wherein the data connections are formed between the processes of the first plurality of processes and processes of the second plurality of processes.

Invoking the second plurality of processes includes invoking at least some of said processes on processors hosting the first plurality of processes, and wherein at least some of the data connections are local said processors.

Providing the information for forming a data connection includes selecting an endpoint for the data connection from a plurality of available endpoints according to a location of a requesting process and locations of the available endpoints.

In another aspect, in general, software is stored on a non-transitory computer-readable medium, for processing data. The software includes instructions for causing a system to: provide a specification of one or more named units stored in a distributed filesystem; provide a specification for establishing data connections with a computation system; provide a specification for processes of a first plurality of processes for invocation on a distributed processing system, each process of the first plurality of processes being specified for establishing a data connection with a storage element of the distributed filesystem for accessing a corresponding part of the named unit in the distributed filesystem; receive requests to form a plurality of data connections between the distributed processing system and the computation system, and provide information for forming at least one data connection being between each process of the first plurality of processes and the computation system; and receive data concurrently over the plurality of data connections from the first plurality of processes at the computation system.

In another aspect, in general, a system for processing data includes: a distributed filesystem; a distributed processing system; a computation system; and a client of the distributed processing system configured to: provide a specification of one or more named units stored in the distributed filesystem; provide a specification for establishing data connections with the computation system; provide a specification for processes of a first plurality of processes for invocation on the distributed processing system, each process of the first plurality of processes being specified for establishing a data connection with a storage element of the distributed filesystem for accessing a corresponding part of the named unit in the distributed filesystem; receive requests to form a plurality of data connections between the distributed processing system and the computation system, and provide information for forming at least one data connection being between each process of the first plurality of processes and the computation system; and receive data concurrently over the plurality of data connections from the first plurality of processes at the computation system.

In another aspect, in general, a method for processing data, the data being provided from a distributed processing system implementing a map-reduce data processing framework, includes: providing to the distributed processing system a specification for a map procedure for invocation on the distributed processing system, the specification for the map procedure identifying one or more named units in a distributed filesystem for processing and including a specification for establishing data connections with a computation system separate from the distributed processing system; causing execution of a plurality of instances of the map procedure on the distributed processing system; receiving requests to form a plurality of data flow connections between executing instances of the map procedure and the computation system, and providing information for forming at least one data flow connection being between each executing instance of the map procedure and the computation system; and receiving data concurrently over the plurality of data flow connections and processing the received data in the computation system.

Aspects can include one or more of the following features.

The distributed processing system includes an Apache Hadoop® system.

The data flow connections include transport layer data network communication connections.

In another aspect, in general, software is stored on a non-transitory computer-readable medium, for processing data, the data being provided from a distributed processing system implementing a map-reduce data processing framework. The software includes instructions for causing a system to: provide to the distributed processing system a specification for a map procedure for invocation on the distributed processing system, the specification for the map procedure identifying one or more named units in a distributed filesystem for processing and including a specification for establishing data connections with a computation system separate from the distributed processing system; cause execution of a plurality of instances of the map procedure on the distributed processing system; receive requests to form a plurality of data flow connections between executing instances of the map procedure and the computation system, and provide information for forming at least one data flow connection being between each executing instance of the map procedure and the computation system; and receive data concurrently over the plurality of data flow connections and process the received data in the computation system.

In another aspect, in general, a system for processing data includes: a distributed filesystem; a distributed processing system; a computation system separate from the distributed processing system; and a client of the distributed processing system configured to: provide to the distributed processing system a specification for a map procedure for invocation on the distributed processing system, the specification for the map procedure identifying one or more named units in the distributed filesystem for processing and including a specification for establishing data connections with the computation system; cause execution of a plurality of instances of the map procedure on the distributed processing system; receive requests to form a plurality of data flow connections between executing instances of the map procedure and the computation system, and provide information for forming at least one data flow connection being between each executing instance of the map procedure and the computation system; and receive data concurrently over the plurality of data flow connections and processing the received data in the computation system.

One or more aspects of the approach address the technical problem of efficient access to data stored in a distributed filesystem. A technical solution of invoking multiple instances of an extraction procedure (e.g., under the control of supervisor or manager), each providing a stream of data to a computation system, permits the multiple instances of the extraction procedure to have efficient parallel access to the data. This solution has a technical advantage of avoiding a bottleneck in extraction of the data, for example using a native filesystem command (e.g., the "hadoop fs-cat file" command). By avoiding the bottleneck, it can be feasible to perform data processing in a separate computation system, thereby not being limited to the forms of computation (e.g., MapReduce) that may be available on the filesystem.

One or more aspects provide computational advantages over a conventional Hadoop system. Ordinarily, Hadoop works on a MapReduce paradigm where the outputs of the Map jobs as well as the outputs of the Reduce jobs are written to files. While this is highly parallel, is suffers from input/output challenges due to multiple file writes. Ordinarily, this is tolerated because of the benefits of parallelism that people get with Hadoop. Nevertheless, the benefits of parallelism can be achieved without the input/output cost by the approaches described herein. In some examples, efficiency is achieved by intercepting the output of the Map jobs in parallel and, without writing those results to files and instead transmitting them via TCP/IP to a parallel operating system that is capable of processing the data in parallel. Such a method thereby achieves both parallel speed and no file input/output cost. Another benefit is that MapReduce is relatively inflexible and not nimble, and does not join well with other databases, and by bringing the data out of the MapReduce paradigm, additional flexibility, interoperability, efficiency, speed, etc. can be obtained.

Other features and advantages of the invention will become apparent from the following description, and from the claims.

DESCRIPTION

Figure 2:
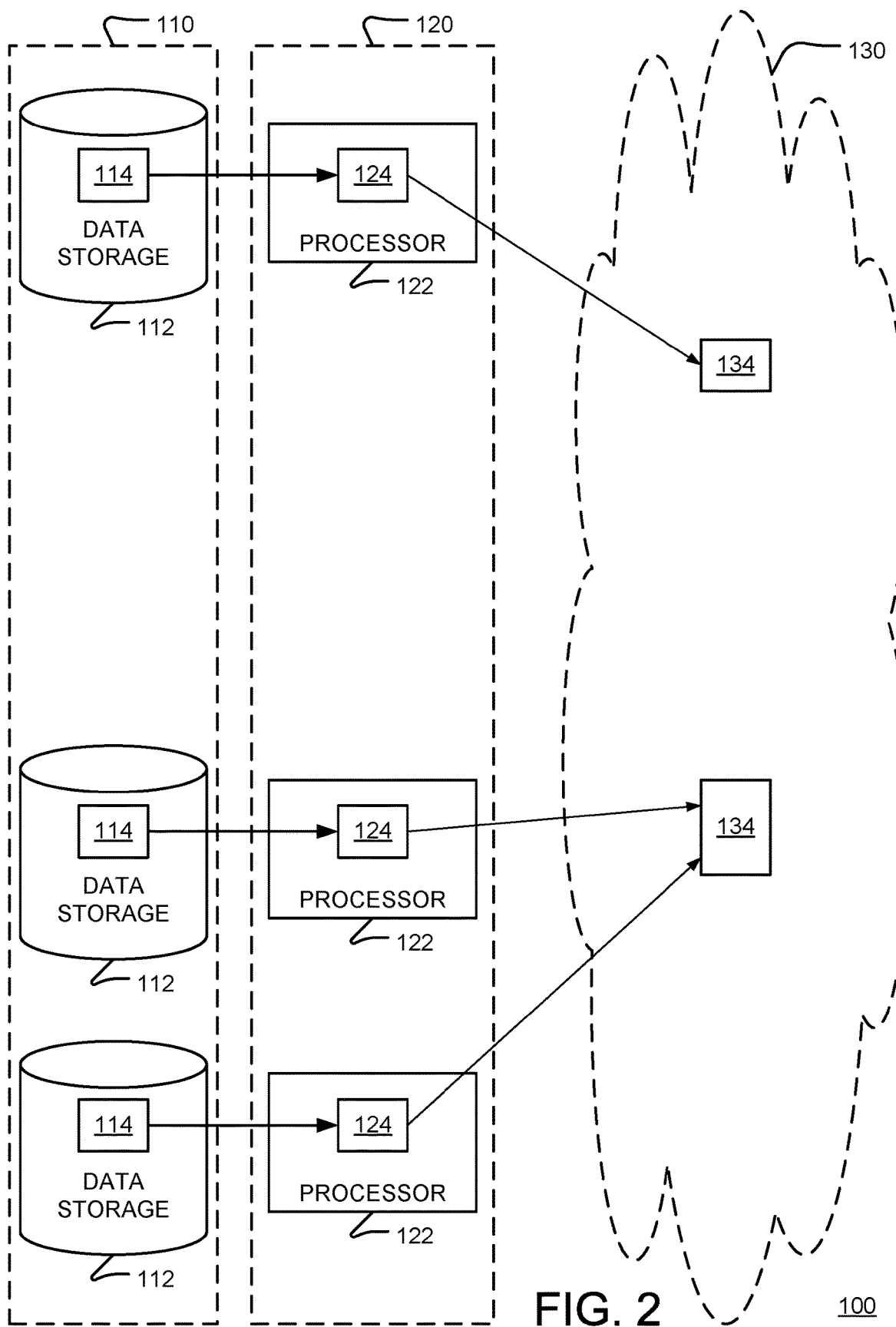
FIG. 2 is a block diagram of a system for providing parallel access to a distributed file system.

Referring to FIG. 2, a computing system 100 includes a distributed file system 110, a distributed processing system 120, and also includes or has access to a computation system 130. One example of a file system 110 of this type is a Hadoop Distributed File System (HDFS), and the distributed processing system 120 is the Hadoop framework, but it should be understood that the approaches described herein are not limited to use in conjunction with a HDFS. The distributed file system 110 includes storage for a number of named units, which are referred to below as "files" without intending to connote particular attributes with the word "file." In general, the names of the files may include paths that reference containing units, such as folders. In general, each file may have portions of it stored on different data storages 112 (e.g., disk subsystems) of the file system.

Figure 1A:
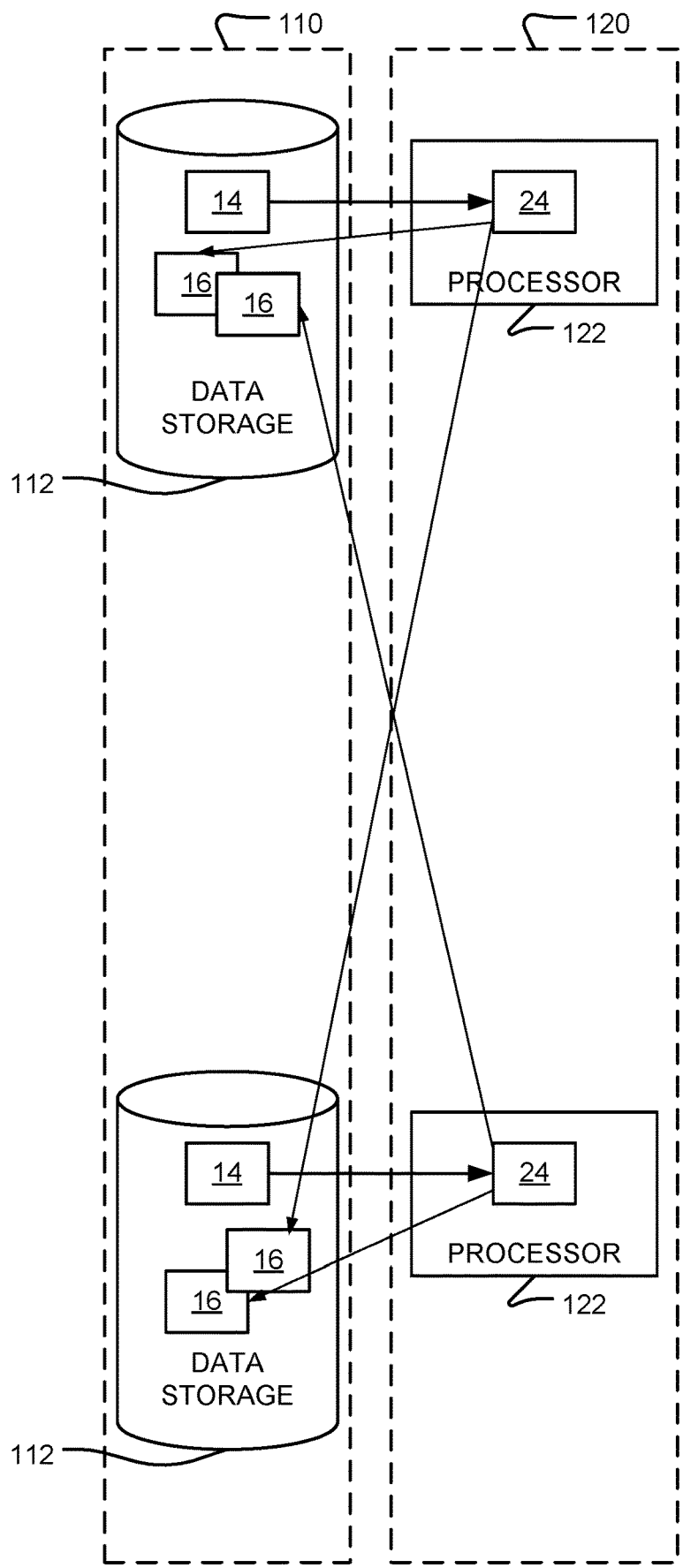
FIGS. 1A and 1B are block diagrams illustrating map and reduce operations, respectively.
Figure 1B:
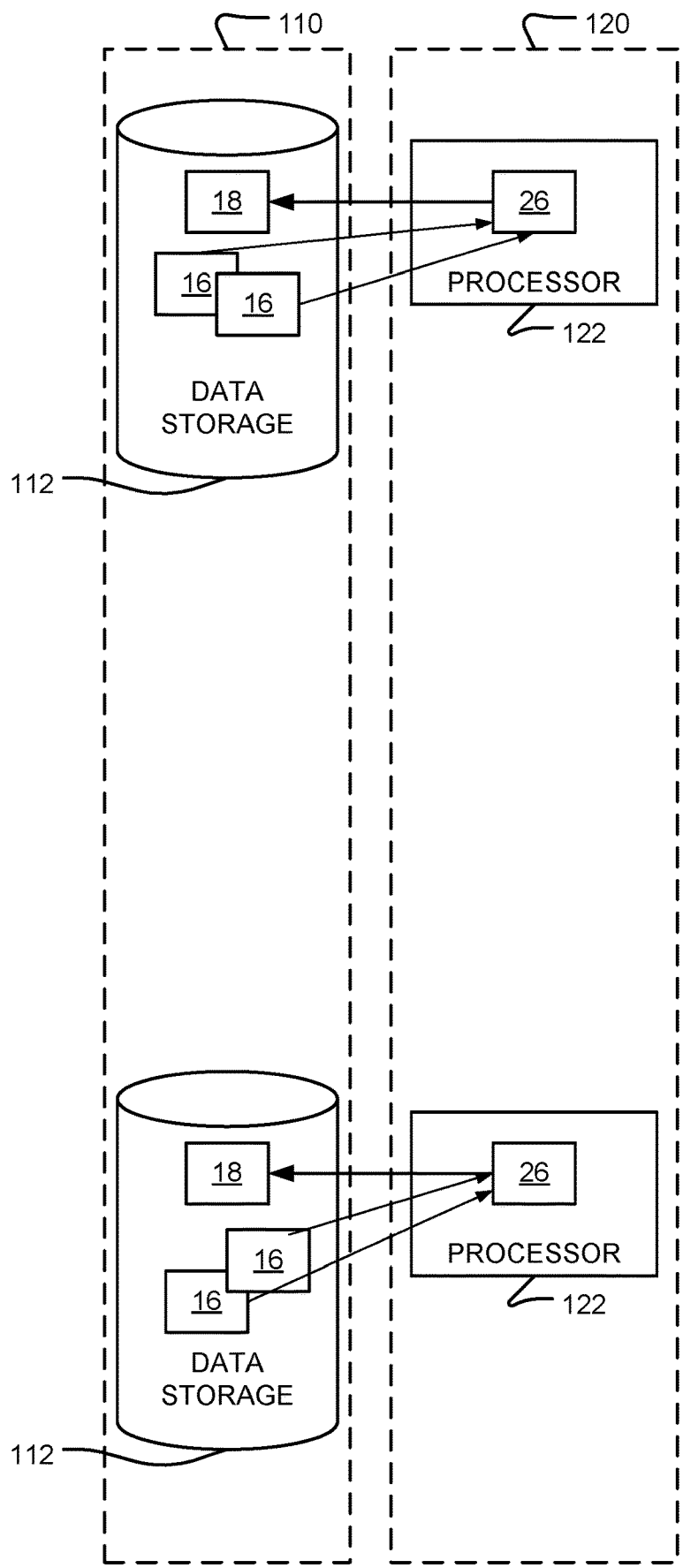

In some implementations, the approaches described above make use of a Hadoop framework to cause execution of copies of map procedures 124 in parallel on processors 122, such that the map procedures 124 efficiently access parts 114 of a named filed in the Hadoop filesystem. However, rather than using the Hadoop framework to cause the map procedures to store intermediate files in the Hadoop filesystem, in a manner as illustrated in FIG. 1A, for further processing in a reduce phase in a manner illustrated in FIG. 1B, the map procedures 124 are configured to stream data determined from the file parts 114 directly to a computation system 130 in multiple separate stream without requiring intermediate data to be stored in the Hadoop filesystem. The Hadoop system can determine the number of and appropriate processors 122 on which to execute the map procedures 124 should execute, thereby providing efficient access to the parts 114. In such implementations, because the data is passed directly from the map procedures, the reduce procedures can be omitted. Note that the description below is not limited to the implementations that make use of a Hadoop infrastructure.

One function that is supported by the computing system 100 is a parallel extraction of the contents of one or a collection of named units in the file system 110 for processing in the computation system 130. In general, the computation system 130 has the capability of receiving and processing multiple streams of data more efficiently than if all the data were passed through a single stream. In some examples, these streams make use of TCP/IP based sessions over a local area network, and other forms of data transfer (e.g., using Unix named pipes) are used in other examples. Note that the reference to the data being transferred as "streams" should be understood in its generality, and not to connote any particular mode of data transfer (e.g., "streaming").

A representative named unit is represented in FIG. 2 as having parts 114 resident in multiple of the data storages 112. The parallel extraction function provides a transfer of data in these parts 114 to processes 134 in the computation system 130. For example, each process 134 may be able to access one or more data streams. So in some cases, there may be a one-to-one correspondence between parts 114 of the data and processes 134, but more generally there may be a many-to-one relationship between the parts and the processes. In some embodiments, a named unit stored in the distributed file system 110 is made up of a set of subunits, which for the sake of description are referred to here as "records" without intending to connote particular characteristics to these subunits. Each part 114 of the named unit in the file system is made up of one or more of these records. In the discussion below, these records are treated as being unordered. However, the records may be ordered being associated with (e.g., stored in conjunction with the records) record numbers that can be used to reconstruct the order for the entire file.

The distributed processing system 120 has a number of separate processors 122 (e.g., physical or virtual computation nodes, servers, and/or other units providing computation services). Each processor has access to one or more of the data storages 112 (e.g., physical or logical disks, multiple disk subsystems, etc.). In general, a particular processor 122 can access one or more of the data storages 112 more efficiently than others. For example, a processor 122 may be able to access a storage 112 that has a local data connection to that processor more efficiently than it is able to access a storage 112 that requires the data to be transferred over a local area network. During performance of the extraction function, an extraction process 124 (e.g., an operating system process or a computation unit within an operating system process) is executed on each or multiple of the processors 122 of the distributed processing system. Each process accesses one or more parts 114 of the file to be extracted, and contents of that part (e.g., the records) pass over data connection to one of the processes 134 of the computation system 130.

Figure 3:
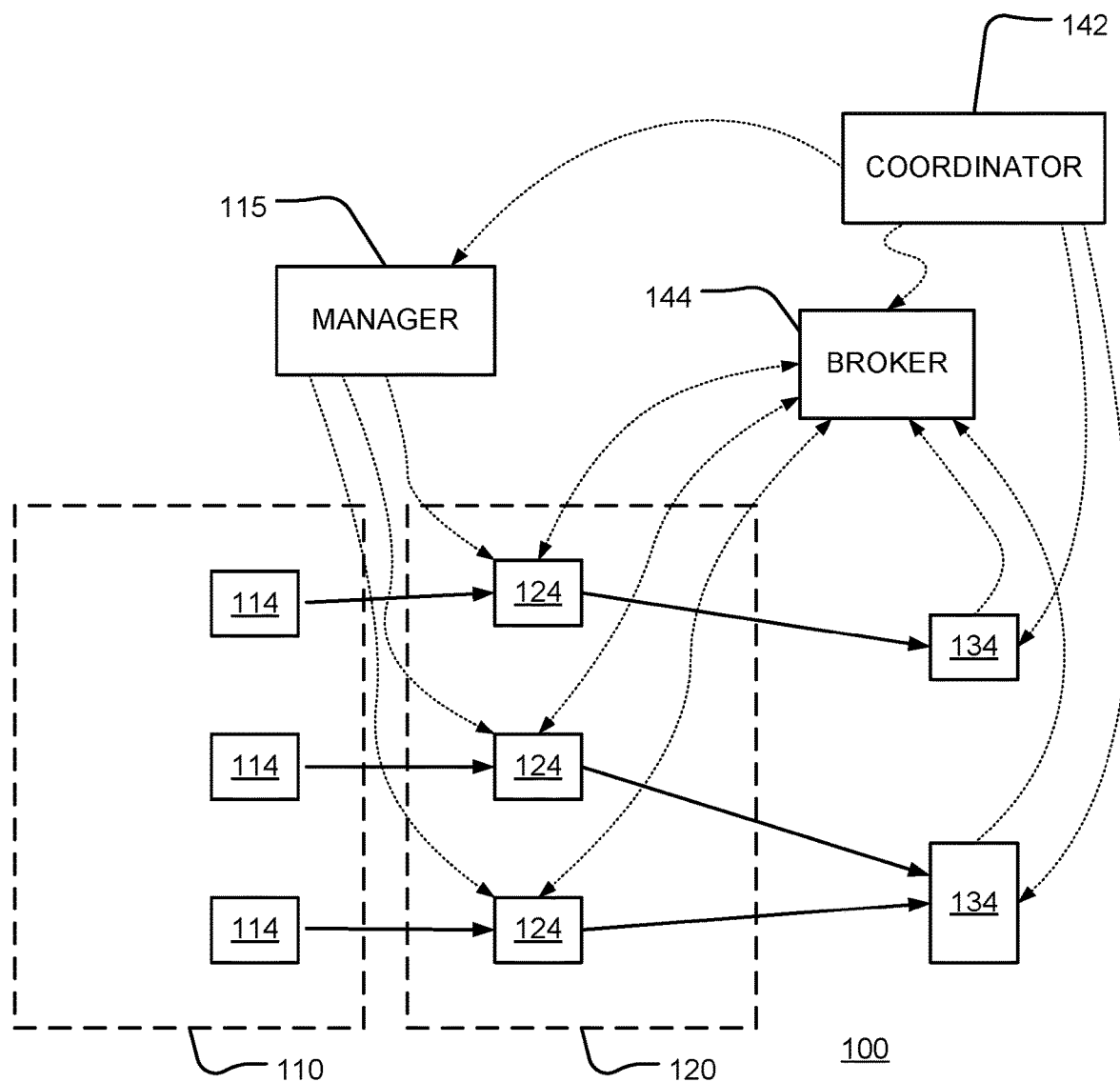
FIG. 3 is a block diagram of the system that illustrates control communication for establishing the parallel access to the filesystem.

Referring to FIG. 3, an embodiment of the parallel extraction function makes use of a number of elements that coordinate the invocation of processes involved in the extraction process and aid in the establishing of data connections between these processes. FIG. 3 shows the procedures and other component that are used to coordinate establishing connections between the processes 124 (e.g., Hadoop map procedures) and processes 134, where data provided by the processes 124 is further processed. The dotted lines illustrate paths of control communication used in establishing the connections. In this embodiment, a coordinator 142 is responsible for causing the processing by a number of processes 134 of data for a particular file or file collection that is resident in the distributed file system 110. The coordinator 142 causes the processes 134 to be invoked (e.g., as operating system processes or other computation units within operating system processes). The coordinator 142 also passes information to each invoked process 134 so that that process can contact a broker 144, and each invoked process 134 passes information, including information about its location (e.g., identification of the processor hosting the process), to the broker. In some implementation, the broker 144 is also invoked by the coordinator 142, or the functions of the coordinator 142 and broker 144 are combined into one unit. The coordinator 142 then communicates to a manager 115 of the distributed file system 110 and associated processing system 120. The coordinator 142 passes the name of the file or file collection to be processed, as well as the location of the broker 144, to the manager 115.

At this time, or in a prior configuration, the coordinator 142 identifies (e.g., by name, code) to the manager 115 the procedure to be invoked on the processors 120 to extract the parts of the named file. The manager 115 determines where the parts 114 (see FIG. 1) of the named file are resident, and based on this determines on which processors 120 (see FIG. 1) to invoke the procedure as one of the processes 124. The invoked processes 124 are informed at the time they are invoked or through subsequent communication with the manager 115 as to how to contact the broker 144. Each process 124 contacts the broker requesting information, such as an address, at which to contact one of the processes 134 that will receive the data. In at least some implementations, the broker selects one of processes 134 according to the location of the process, for example, to reduce communication overhead in the data transfer from the requesting extraction process 124 and the receiving process 134 (e.g., by co-locating the processes on one processor), and sends the address information for the selected processes 134 back to the extraction process 124. The processes 124 then contacts the process 134 to establish the data connection.

At this point the data connections between the data storages 112, the processes 124, and the processes 134, (shown in bold lines in FIG. 2) are established, and the processes 124 begin to transfer data in parallel from the distributed file system 110 to the processes 134 of the computation system 130.

Note that the function of an explicit broker 144 is not necessary in all implementations. For example, the processes 124 can use a network broadcast approach to invite processes 134 to respond to form the connections, and the processes 134 can respond individually, or coordinate as a group to respond to the processes 124 to form the connections.

In one specific implementation in which the distributed file system is a Hadoop Distributed File System (HDFS), the manager 115 is implemented as a native part of a MapReduce System. In this implementation, the coordinator 142 (which is not native to the MapReduce System) specifies the file name and a Map function to execute, without specifying a corresponding Reduce processing. The manager 115 follows conventional MapReduce processing to orchestrate the execution of the specified Map function as the processes 124 according to its awareness of the locations of the parts of the named file in the filesystem. The specification of the Map function incorporates the information necessary for each instance of the Map function to communicate with the broker 144, and thereby forms the data connection with a process 134 of the computation system 130.

It should be understood that the distributed processing system 120 and the computation system 130 are not necessarily hosted on different computer processing nodes. For example, as introduced above, a common set of processors (e.g., processing nodes, servers) may be used by the manager 115 to host the processes 124, and be used by the coordinator 142 to host the processes 134, which actually process the data. In some examples, when the communication between a process 124 and a process 134 does not pass between nodes, an efficient data passing approach can be used, for example, using Unix named pipes, message passing through shared memory, etc. Note that using separate extraction processes 124 and processes 134 which receive the data permits different types of software to be executed while maintaining efficient communication between them. For example, the extraction processes may be implemented in Java as separate tasks within a Java Virtual Machine (JVM) while a process 134 may be implemented as an operating system process, for example, implemented in C or C++.

The computation system 130 may have various forms. As one example, the system implements a dataflow graph that include vertices (representing data processing components) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. In this example, the processes 134 may implement a subset of the components of the dataflow graph, and provide outputs to yet other components. For example, a dataflow graph may include a component that is configured to execute in parallel with multiple instances of that component executing on different computation nodes. Each of the processes 134 may be executing as one of the instances of a parallel component that reads data from the distributed processing system 120.

As other examples, the processes 134 may form part of a database system. For example, the parts 114 of a file may represent parts of a database table, and the processes 134 are configured to process a database table in parallel, for example, as part of executing a query involving one or more tables.

In some implementations, the function of the manager 115 is combined with the coordinator 142, and optionally the functions of the extraction processes 124 and destination processes 134 may be combined. In one such implementation, the coordinator/manager uses the name of the file or file collection to access a catalog in the distributed file system to determine the storages 112 on which the parts of those files are stored, and optionally to determine the record structure of the data in those files. The coordinator/manager then invokes the extraction procedures 124, or combine extraction and processing procedures on the appropriate processors selected in the same or similar manner as described above for the manager 115. In some implementations, the same named file or file collection is first processed to build and store an index of records in the file. Later, when the coordinator/manager wishes to extract a subset of the records matching a query, the index is read in and the extraction procedures are invoked on the processors so that less than the whole file or file collection needs to be read, for example, reading only the matching records of the file or file collection, thereby increasing the efficiency of the extraction function.

Note that there are many alternatives for implementation of the approaches described above. In particular, the components that are referred to as "processes" are not necessarily implemented as operating system processes (e.g., executed in a Unix environment with an exec( ) system call). Alternatives include lightweight processes (e.g., threads)

within a context of an operating system process, applications executing with a virtual machine environment (e.g., Java applications or applets executing with a Java Virtual Machine (JVM)), tasks explicitly scheduled within the context of a process without the use of operating system primitives such as threads, or virtual machines executing within a context of hypervisors.

In some embodiments, the processes 124 executed in the distributed processing system 120 are not necessarily limited to transfer of data between the filesystem 110 and the computation system 130. In some examples, these processes are further configured (e.g., by the coordinator 142, see FIG. 2) to perform certain computations on the data. For example, the each process 124 may extract and/or transform fields of records from retrieved from the filesystem.

The approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for processing data, the method including:
   receiving a specification of one or more named units stored in a distributed filesystem of a distributed processing system, the distributed processing system configured to invoke a first type of software processes;
   receiving a specification for establishing data connections to a plurality of destination processes on a computation system from the distributed processing system, the computation system configured to invoke a second type of software processes different from the first type of software processes for the distributed processing system;
   invoking a plurality of extraction processes on the distributed processing system, and establishing, for each extraction process, a data connection with a storage element of the distributed filesystem for accessing a respective part of the one or more named units in the distributed filesystem, wherein each extraction process of the plurality of extraction processes is of the first type of software processes;
   using the specification for establishing the data connections to form a plurality of data connections between the distributed processing system and the computation system, at least one data connection being formed between each of the plurality of destination processes on the computation system and the invoked plurality of extraction processes of the distributed processing system; and
   passing data concurrently over the plurality of data connections from the distributed processing system to the computation system;
   wherein the first type of software processes includes a first type of an extraction process and a corresponding first type of a receiving process;
   wherein invoking the plurality of extraction processes includes invoking a plurality of instances of the first type of the extraction process on the distributed processing system;
   wherein the plurality of destination processes of the second type of software processes includes a plurality of instances of a second type of a destination receiving process, with the second type of the destination receiving process being different than the first type of the receiving process corresponding to the first type of the extraction process;
   and wherein using the specification for establishing the data connections includes using the specification for establishing the data connections to form the plurality of data connections between the distributed processing system and the computation system, at least one data connection being formed between each of the one or more instances of the destination receiving process of the second type of software processes on the computation system and the invoked plurality of instances of the first type of the extraction process of the distributed processing system.

2. The method of claim 1, wherein passing data concurrently over the plurality of data connections from the distributed processing system to the computation system includes:
   streaming data from each part of the one or more named units via the established data connection to the respective one of the plurality of extraction processes, and to a respective destination process via the corresponding data connection between the respective destination process and the one of the plurality of extraction processes, without storing the streamed data in intermediate storage on the distributed processing system on which the respective one of the plurality of extraction processes is invoked.

3. The method of claim 1, wherein the distributed processing system configured to invoke the first type of software processes is configured to invoke a map-reduce data processing framework processes native to the distributed processing system.

4. The method of claim 1, wherein invoking the plurality of extraction processes on the distributed processing system includes invoking the plurality of extraction processes based on the specification of the one or more named units, received from a coordinator system that is non-native to the distributed processing system, and based further on the specification, also received from the coordinator system, for establishing the data connections to the plurality of destination processes received.

5. The method of claim 4, wherein invoking the plurality of extraction processes includes:
identifying type of extraction process to invoke based on the specification for establishing the data connections to the plurality of destination processes; and
invoking the plurality of extraction processes according to the identified type of extraction process.

6. The method of claim 1, wherein using the specification for establishing the plurality of data connections includes:
selecting a particular destination process, from the plurality of destination processes, to connect to a respective invoked extraction process based on location information, provided in the specification for establishing data connections, identifying location of a processor executing the particular destination process so that communication overhead to transfer data between the plurality of extraction processes and the plurality of destination processes is reduced.

7. The method of claim 6, wherein selecting the particular destination process to connect to the respective invoked extraction process based on the location information includes:
selecting, by a broker system that is non-native to the distributed processing system, the particular destination process, from the plurality of destination processes, to connect to the respective invoked extraction process based on location information, received by the broker system from the invoked plurality of destination processes, identifying location of a processor executing the particular destination process so that communication overhead to transfer data between the plurality of extraction processes and the plurality of destination processes is reduced.

8. The method of claim 1, wherein receiving the specification for establishing the data connections includes receiving the specification for establishing the data connections for a broadcast to the computation system.

9. The method of claim 1, wherein at least some of the plurality of extraction processes and some of the plurality of destination processes are executed on a common set of processors.

10. The method of claim 1, wherein the distributed processing system and the computation system use distinct computing resources coupled over a data network.

11. The method of claim 1, wherein the distributed processing system and the computation system share computing resources.

12. A system, implemented at least partially by hardware, for processing data, the system including:
a distributed processing system that includes a distributed filesystem, the distributed processing system configured to invoke a first type of software processes; and
a computation system configured to invoke a second type of software processes different from the first type of software processes for the distributed processing system;
wherein the distributed processing system is configured to:
receive a specification of one or more named units stored in the distributed filesystem of the distributed processing system;
receive a specification for establishing data connections to a plurality of destination processes on the computation system, from the distributed processing system;
invoke a plurality of extraction processes on the distributed processing system, and establish, for each extraction process, a data connection with a storage element of the distributed filesystem for accessing a respective part of the one or more named units in the distributed filesystem, wherein each extraction process of the plurality of extraction processes is of the first type of software processes;
use the specification for establishing the data connections to form a plurality of data connections between the distributed processing system and the computation system, at least one data connection being formed between each of the plurality of destination processes on the computation system and the invoked plurality of extraction processes of the distributed processing system; and
pass data concurrently over the plurality of data connections from the distributed processing system to the computation system;
wherein the first type of software processes includes a first type of an extraction process and a corresponding first type of a receiving process;
wherein the distributed system configured to invoke the plurality of extraction processes is configured to invoke a plurality of instances of the first type of the extraction process on the distributed processing system;
wherein the plurality of destination processes of the second type of software processes includes a plurality of instances of a second type of a destination receiving process, with the second type of the destination receiving process being different than the first type of the receiving process corresponding to the first type of the extraction process;
and wherein the distributed system configured to use the specification for establishing the data connections is configured to use the specification for establishing the data connections to form the plurality of data connections between the distributed processing system and the computation system, at least one data connection being formed between each of the one or more instances of the destination receiving process of the second type of software processes on the computation system and the invoked plurality of instances of the first type of the extraction process of the distributed processing system.

13. The system of claim 12, wherein the distributed processing system configured to pass data concurrently over the plurality of data connections from the distributed processing system to the computation system is configured to:
  stream data from each part of the one or more named units via the established data connection to the respective one of the plurality of extraction processes, and to a respective destination process via the corresponding data connection between the respective destination process and the one of the plurality of extraction processes, without storing the streamed data in intermediate storage on the distributed processing system on which the respective one of the plurality of extraction processes is invoked.

14. The system of claim 12, wherein the distributed processing system configured to invoke the first type of software processes is configured to invoke a map-reduce data processing framework processes native to the distributed processing system.

15. The system of claim 12, further comprising a coordinator system that is non-native to the distributed processing system, wherein the distributed processing system configured to invoke the plurality of extraction processes on the distributed processing system is configured to:
  invoke the plurality of extraction processes based on the specification of the one or more named units, received from the coordinator system, and based further on the specification, also received from the coordinator system, for establishing the data connections to the plurality of destination processes.

16. The system of claim 15, wherein the distributed processing system configured to invoke the plurality of extraction processes is configured to:
  identify type of extraction process to invoke based on the specification for establishing the data connections to the plurality of destination processes; and
  invoke the plurality of extraction processes according to the identified type of extraction process.

17. The system of claim 12, further comprising a broker system, that is non-native to the distributed processing system, configured to:
  select a particular destination process, from the plurality of destination processes, to connect to a respective invoked extraction process based on location information, provided in the specification for establishing data connections, identifying location of a processor executing the particular destination process so that communication overhead to transfer data between the plurality of extraction processes and the plurality of destination processes is reduced.

18. Software stored on a non-transitory computer-readable medium, for processing data, the software including instructions for causing a system to:
  receive a specification of one or more named units stored in a distributed filesystem of a distributed processing system, the distributed processing system configured to invoke a first type of software processes;
  receive a specification for establishing data connections to a plurality of destination processes on a computation system from the distributed processing system, the computation system configured to invoke a second type of software processes different from the first type of software processes for the distributed processing system;
  invoke a plurality of extraction processes on the distributed processing system, and establish, for each extraction process, a data connection with a storage element of the distributed filesystem for accessing a respective part of the one or more named units in the distributed filesystem, wherein each extraction process of the plurality of extraction processes is of the first type of software processes;
  use the specification for establishing the data connections to form a plurality of data connections between the distributed processing system and the computation system, at least one data connection being formed between each of the plurality of destination processes on the computation system and the invoked plurality of extraction processes of the distributed processing system; and
  pass data concurrently over the plurality of data connections from the distributed processing system to the computation system;
  wherein the first type of software processes includes a first type of an extraction process and a corresponding first type of a receiving process;
  wherein the instructions for causing the system to invoke the plurality of extraction processes include one or more instructions for causing the system to invoke a plurality of instances of the first type of the extraction process on the distributed processing system;
  wherein the plurality of destination processes of the second type of software processes includes a plurality of instances of a second type of a destination receiving process, with the second type of the destination receiving process being different than the first type of the receiving process corresponding to the first type of the extraction process;
  and wherein the instructions for causing the system to use the specification for establishing the data connections include one or more instructions for causing the system to use the specification for establishing the data connections to form the plurality of data connections between the distributed processing system and the computation system, at least one data connection being formed between each of the one or more instances of the destination receiving process of the second type of software processes on the computation system and the invoked plurality of instances of the first type of the extraction process of the distributed processing system.

19. The software of claim 18, wherein the instructions for causing the system to pass data concurrently over the plurality of data connections from the distributed processing system to the computation system include one or more instructions for causing the system to:
  stream data from each part of the one or more named units via the established data connection to the respective one of the plurality of extraction processes, and to a respective destination process via the corresponding data connection between the respective destination process and the one of the plurality of extraction processes, without storing the streamed data in intermediate storage on the distributed processing system on which the respective one of the plurality of extraction processes is invoked.

20. The software of claim 18, wherein the distributed processing system configured to invoke the first type of software processes is configured to invoke a map-reduce data processing framework processes native to the distributed processing system.

* * * * *